Sept. 20, 1932.  G. O. SMITH  1,878,003
BELT CLAMP
Filed Aug. 3, 1931
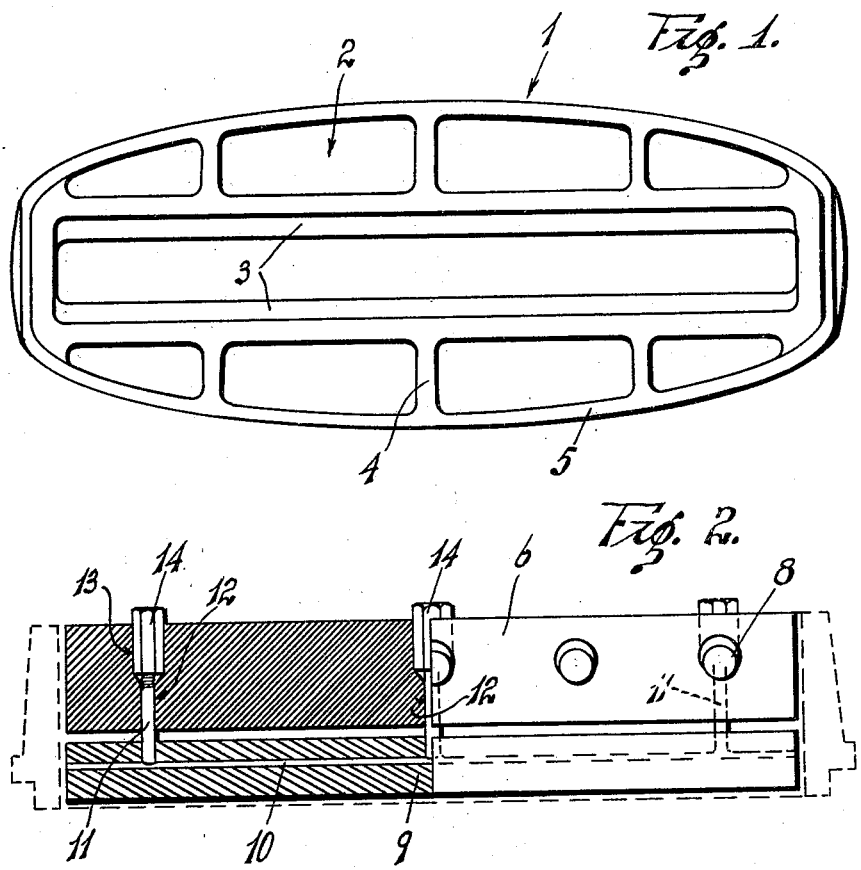
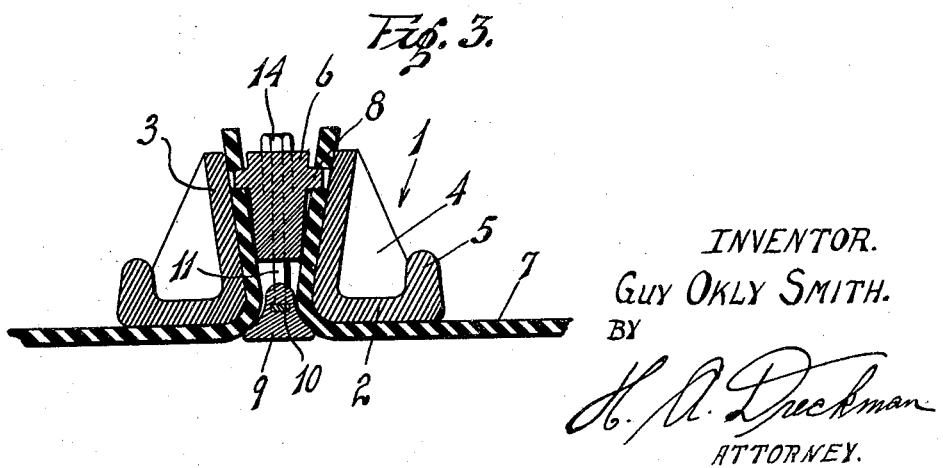
INVENTOR.
GUY OKLY SMITH.
BY
ATTORNEY.

Patented Sept. 20, 1932

1,878,003

UNITED STATES PATENT OFFICE

GUY OKLY SMITH, OF WHITTIER, CALIFORNIA

BELT CLAMP

Application filed August 3, 1931. Serial No. 554,771.

This invention relates to a belt clamp whereby the ends of a belt are secured together with a minimum amount of effort.

An object of my invention is to provide a belt clamp which is relatively light, and the body of which is so constructed that it has great strength and will not readily break due to the stresses while operating on a belt.

Another object is to provide a belt clamp which will effectively grip the ends of the belt and will hold them against slipping.

A further object is to provide a belt clamp with a novel closure or packing strip at the bottom of the clamp, said strip closing the opening between the ends of the belt and where the belt curves out of the body.

Other objects, advantages, and features of invention may appear from the accompanying drawing, the subjoined detailed description, and the appended claims.

In the drawing:

Figure 1 is a top plan view of the clamp body.

Figure 2 is a view half in section and half in elevation of the wedge and the fillet strip.

Figure 3 is a transverse sectional view of my clamp.

Referring more particularly to the drawing, the numeral 1 indicates a body formed of a suitable metal, and consisting of an integral base 2 and side walls 3. The side walls 3 diverge upwardly from the base 2 for a purpose to be further described. A plurality of vertical webs 4 are integrally formed with the base and the side walls. An upturned flange 5 surrounds the base 2 for the purpose of strengthening the entire body structure and preventing a possible fracture of the body due to the high stresses while the clamp is operating on a belt.

An elongated wedge plate 6 fits between the tapering walls 3 and bears against the ends of the belt 7, as shown in Figure 3. The entire lower portion of the wedge plate 6 bears against the belt, thus providing a bearing surface of ample area to hold the belt against slipping.

A plurality of bosses 8 project horizontally from both sides of the wedge 6 and these bosses act as an additional safeguard against possible belt slippage in that they press into the belt, as shown in Figure 3. A fillet 9 fits into the space between the ends of the belt at the bottom of the body, and this fillet is preferably formed of some composition material, or of rubber, or the like. The metal strip 10 extends horizontally through the fillet 9 and a plurality of studs 11 are secured to the strip 10 and extend vertically above the fillet. Vertical bores 12 are provided in the wedge 6 to accommodate the studs 11. The upper ends of these bores are counter bored as at 13 so that they may receive an elongated nut 14 which screws on to the upper end of the studs 11. When the nuts 14 are tightened, the wedge 6 and the fillet 9 are drawn together, and the belt is securely pressed against the side walls of the body and against the lower edges of the wedge. The fillet also serves the purpose of closing the gap between the ends of the belt so that a smooth and continuous surface is presented to the pulleys over which the belt travels.

Having described my invention, I claim:

1. A belt clamp comprising a body, upwardly diverging walls integrally formed on the body, a wedge plate, said wedge plate being positioned between said walls, a fillet, and means connecting said fillet and wedge plate whereby they are drawn together to clamp the belt ends in position.

2. In a belt clamp, a metal body including a base, integrally formed side walls, said side walls diverging upwardly, a wedge plate, said wedge plate being positioned between said walls, a fillet, a plurality of studs rising from the fillet, said wedge plate having bores therein to receive the studs, and a nut screwed on each of the studs whereby the fillet and the wedge plate are drawn together to clamp the belt ends in position.

3. A belt clamp comprising a body, upwardly divergent walls on the body, a metal wedge plate, said wedge plate being positioned between said walls, a plurality of bosses extending from the wedge plate and adapted to engage the belt, a fillet, and means connecting the fillet and the wedge plate whereby they are drawn together to clamp the belt ends in position.

4. A belt clamp comprising a body, upwardly divergent walls on the body, a metal wedge plate, said wedge plate being positioned between said walls, a plurality of bosses extending from the wedge plate and adapted to engage the belt, a fillet, a plurality of studs rising from the fillet, said wedge plate having bores formed therein to receive the studs, and a nut screwed on each of the studs whereby the fillet and the wedge plate are drawn together to clamp the belt ends in position.

5. In a belt clamp, a metal body including a base, integrally formed side walls rising from the base, said walls diverging upwardly, a metal wedge plate, said wedge plate being positioned between said walls, a plurality of bosses extending from the side of the wedge plate, a fillet, a plurality of studs rising from the fillet and secured therein, said wedge plate having bores therein to receive the studs, and a nut screwed on each of the studs whereby the wedge plate and the fillet are drawn together to hold the belt ends in position.

In testimony whereof, I affix my signature.

GUY OKLY SMITH.